United States Patent
Cradick et al.

(10) Patent No.: US 12,425,211 B2
(45) Date of Patent: Sep. 23, 2025

(54) KEY MANAGEMENT CACHE SYNCHRONIZATION

(71) Applicant: International Business Machines Corporation, Armonk, NY (US)

(72) Inventors: Ryan K. Cradick, Oronoco, MN (US); John A. Riendeau, Madison, WI (US); Paul Gerver, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 18/207,396

(22) Filed: Jun. 8, 2023

(65) Prior Publication Data
US 2024/0413980 A1    Dec. 12, 2024

(51) Int. Cl.
*H04L 9/08* (2006.01)

(52) U.S. Cl.
CPC .......... *H04L 9/0894* (2013.01); *H04L 9/0825* (2013.01); *H04L 9/083* (2013.01); *H04L 9/0891* (2013.01); *H04L 9/0822* (2013.01)

(58) Field of Classification Search
CPC ....... H04L 9/08; H04L 9/0819; H04L 9/0825; H04L 9/0894; H04L 9/0891; H04L 9/083; H04L 9/0822; H04L 63/062; G06F 21/6218
See application file for complete search history.

(56) References Cited

U.S. PATENT DOCUMENTS

| | | |
|---|---|---|
| 9,405,694 B2 | 8/2016 | Goyal et al. |
| 10,182,127 B2 | 1/2019 | Tuliani et al. |
| 10,218,685 B2 * | 2/2019 | Brouwer ............. H04L 67/1042 |
| 10,412,197 B1 | 9/2019 | Britto et al. |

(Continued)

FOREIGN PATENT DOCUMENTS

| | | |
|---|---|---|
| CN | 111931094 A | 11/2020 |
| CN | 113553168 A | 10/2021 |

(Continued)

OTHER PUBLICATIONS

Ghimire Sanjeev. "Protecting and storing data for a mobile bank app", retrieved from web https://web.archive.org/web/20211127114236/ https://developer.ibm.com/blogs/protecting-and-storing-data-for-a-mobile-bank-app/, Oct. 18, 2021, 5 pages.

*Primary Examiner* — Shaqueal D Wade-Wright
(74) *Attorney, Agent, or Firm* — CHIP LAW GROUP

(57) ABSTRACT

Encryption key management for containerized applications is provided. An application container receives a request, directed to a wrapped data encryption key (WDEK), and it is determined whether a local cache associated with the application container stores a mapping of the WDEK to an unwrapped data encryption key (DEK). In response to a cache miss, a shared list, that stores entries corresponding to WDEKs to be synchronized among a plurality of local encryption key caches of a set of application containers, is accessed to determine a set of WDEKs that are missing from the local cache. A key management service provides the WDEKs and corresponding DEKs for the set of WDEKs. The shared list data structure and the local encryption key cache are updated based on the WDEKs and DEKs obtained from the key management service, to thereby synchronize the local encryption key cache with the shared list data structure.

20 Claims, 4 Drawing Sheets

(56) References Cited

U.S. PATENT DOCUMENTS

| | | | |
|---|---|---|---|
| 10,884,938 B2 | 1/2021 | Harnik et al. | |
| 2013/0022196 A1* | 1/2013 | Kambayashi | H04L 9/0836 |
| | | | 380/44 |
| 2016/0173639 A1 | 6/2016 | Tuliani et al. | |
| 2019/0129990 A1* | 5/2019 | Schlarb | G06F 16/2365 |
| 2019/0318102 A1* | 10/2019 | Araya | H04L 9/0897 |
| 2020/0322139 A1* | 10/2020 | Hersans | H04L 9/14 |
| 2022/0182223 A1* | 6/2022 | Shveykin | H04L 9/0894 |
| 2022/0223201 A1 | 7/2022 | Zaidy et al. | |
| 2022/0391494 A1* | 12/2022 | Yang | G06F 21/6209 |

FOREIGN PATENT DOCUMENTS

| | | |
|---|---|---|
| CN | 115130090 A | 9/2022 |
| KR | 102121713 B1 | 6/2020 |

* cited by examiner

KEY MANAGEMENT CACHE SYNCHRONIZATION

BACKGROUND

The present application relates generally to an improved data processing apparatus and method and more specifically to an improved computing tool and improved computing tool operations/functionality for key management cache synchronization, especially with regard to containerized computer applications.

Containers are executable units of software in which application code is packaged along with its libraries and dependencies, in common ways so that the code can be run anywhere, whether it be on a desktop, traditional information technology systems, or in cloud computing systems. To do this, containers take advantage of a form of operating system (OS) virtualization in which features of the OS kernel can be leveraged to isolate processes and control the amount of CPU, memory and disk that those processes can access. A container is an instance of a container image, where the container image is the "blueprint" or "map" of a container environment including system libraries, system tools, and other platform settings that an application needs to run. Multiple containers may be run from the same container image and each container will have the same software and configuration as specified in the container image. Examples of containers include Docker containers, but the illustrative embodiments are not limited to such.

Containers carry all their dependencies with them, meaning that software can be written once and then run without needing to be re-configured across laptops, cloud and on-premises computing environments. Due to a combination of their deployment portability/consistency across platforms, containers are an ideal fit for modern development and application patterns, such as DevOps and microservices, that are built using regular code deployments in small increments. Like virtual machines before them, containers enable developers and operators to improve CPU and memory utilization of physical machines. Where containers go even further is that because they also enable microservices architecture, application components can be deployed and scaled more granularly, which is an attractive alternative to having to scale up an entire monolithic application because a single component is struggling with its load.

In a containerized environment, securing data is often accomplished through encryption, such as envelope encryption in which plaintext data (unencrypted data) is encrypted using an encryption key, and then encrypting the encryption key under a root key. The encryption keys are cached local to the containers in a cache memory so that they can be used without having to call a remote key management system. However, the caching mechanisms still require individual requests to the key management system for encryption keys when the encryption key is not stored in the local cache, resulting in extra network traffic and overhead processing.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In some illustrative embodiments, a method, in a data processing system, is provided for encryption key management for containerized applications. The method comprises receiving, by an application container, a request directed to a first wrapped data encryption key (WDEK), and determining whether a local encryption key cache associated with the application container stores an entry having a mapping of the first WDEK to a first unwrapped data encryption key (DEK). The method further comprises, in response to the local encryption key cache not containing the entry, accessing a shared list data structure that stores entries corresponding to WDEKs to be synchronized among a plurality of local encryption key caches of a set of application containers, to determine a set of WDEKs that are missing from the local encryption key cache. The method also comprises obtaining, from a key management service, the WDEKs and corresponding DEKs for the set of WDEKs that are missing from the local encryption key. Moreover, the method comprises updating the shared list data structure and the local encryption key cache based on the WDEKs and DEKs obtained from the key management service, to thereby synchronize the local encryption key cache with the shared list data structure. Thus, with this method, the application containers may have their local caches of encryption keys synchronized with a shared listing data structure and network traffic and overhead processing is minimized by retrieving the missing WDEKs.

In some illustrative embodiments, the set of WDEKS comprises the first WDEK and at least one second WDEK that is missing from the local encryption key cache. In some illustrative embodiments, the set of WDEK comprises all other WDEKs in the shared list data structure that do not have an entry in the local encryption key cache. Thus, WDEKs that are not the target of the request can be retrieved and stored in the local encryption key cache along with the WDEK that is targeted and thereby reduce the number of requests that must be sent to and processed by the key management service.

In some illustrative embodiments, the shared list data structure is associated with a replica set of an application container image, and the application container is an instance of the replica set. In some illustrative embodiments, a plurality of shared list data structures are maintained by the data processing system, each shared list data structure being associated with a different replica set of a different application container image. Thus, each replica set can have its own corresponding shared list data structure to maintain the local encryption key caches of containers in the replica set synchronized and thereby minimize cache misses and the corresponding network traffic and overhead processing required to handle such cache misses.

In some illustrative embodiments, updating the local encryption key cache comprises caching an entry in the local encryption key cache that maps the WDEK to the unwrapped DEK, and updating the shared list data structure comprises updating a current cache time for an existing entry in the shared list data structure to represent a current time when the entry mapping the WDEK to the unwrapped DEK is cached in the local encryption key cache, or adding a new entry in the shared list data structure for the WDEK if an existing entry in the shared list data structure does not exist. Thus, the local encryption key cache is updated to include entries corresponding to the WDEKs, and the entries in the shared list data structure may be updated to ensure that the WDEKs being used by the containers of the replica set are maintained synchronized between the various containers of the replica set.

In some illustrative embodiments, the shared list data structure does not store the unwrapped DEK. As a result, the shared list data structure can be stored "on disk" so that it can be used in the case of a restart of containers, or a roll over of the containers, to thereby recreate the local encryption key caches of the containers. If the shared list data structure were stored in memory, such as for security reasons if the shared list data structure also stored the unwrapped DEKs, then they would be lost when the replica set is restarted or rolled over.

In some illustrative embodiments, the request is received from an Application Programming Interface (API) server, and the application container is a key management service container of the key management service.

In some illustrative embodiments, the method further comprises checking, on a periodic basis, entries of the local encryption key cache against the shared list data structure to determine WDEKs present in the shared list data structure that do not have an entry in the local encryption key cache to thereby identify a set of missing WDEKs. In some illustrative embodiments, the method also comprises retrieving the set of missing WDEKs and their corresponding unwrapped DEKs from the key management service. In this way, the local encryption key caches may be automatically updated on a periodic basis so as to minimize cache misses when encryption/decryption requests are processed by the containers of the replica set.

In some illustrative embodiments, an entry in the shared list data structure stores a corresponding WDEK, a last cached timestamp, a master container instances that last cached the WDEK, and a request identifier of a request that caused the last caching of the WDEK in the local encryption key cache. Thus, the information in the entry of the shared list data structure may be used for maintenance of the shared list data structure by removing entries that are timed out or stale and maintaining the shared list data structure as having entries for those WDEKs that have been used by containers within a predetermined period of time.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
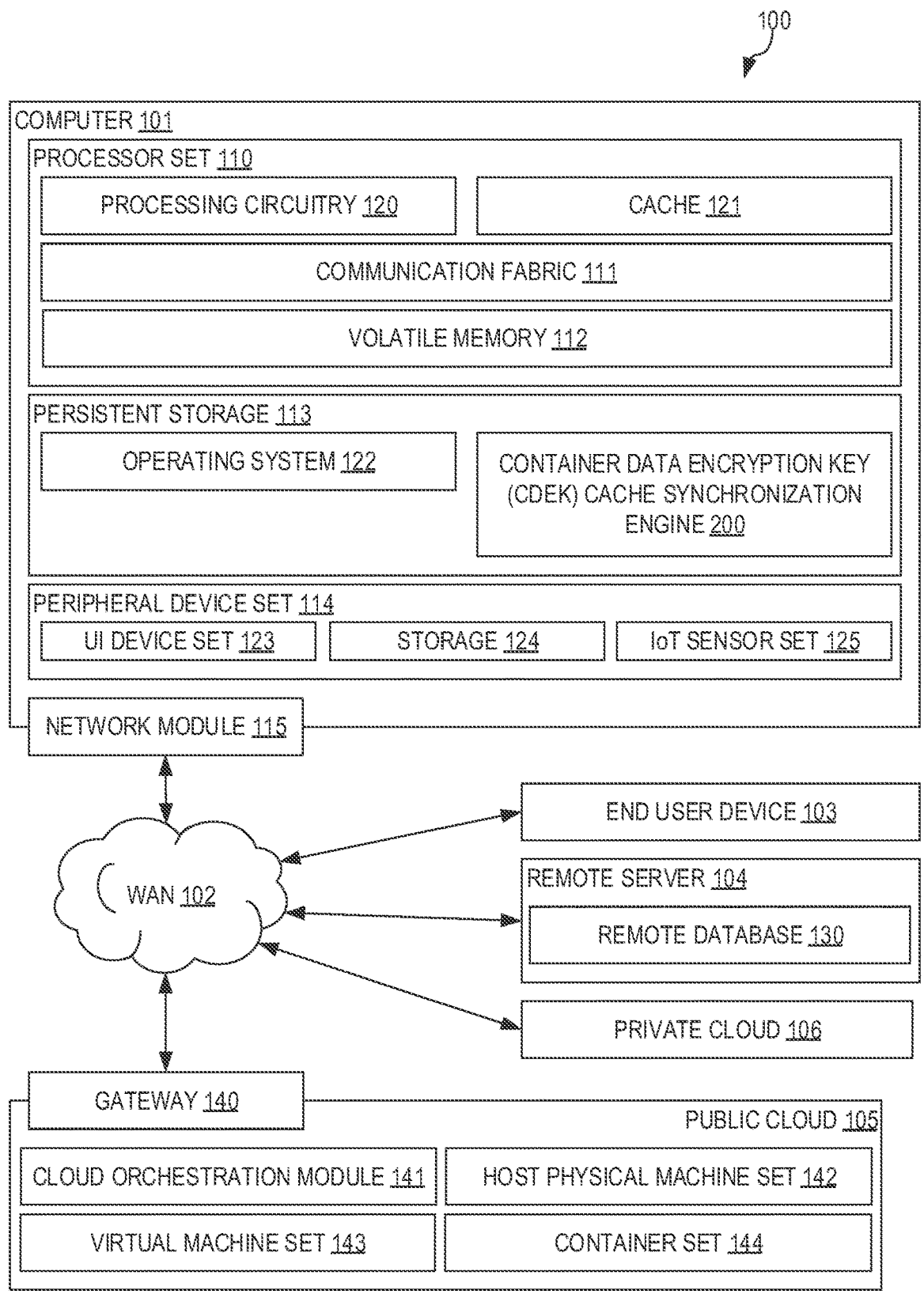
FIG. 1 is an example diagram of a distributed data processing system environment in which aspects of the illustrative embodiments may be implemented and at least some of the computer code involved in performing the inventive methods may be executed.

The illustrative embodiments provide mechanisms for encryption key management and cached key synchronization for containerized applications. The illustrative embodiments provide improved computing tools and improved computing tool functionality/operations that are specifically designed to address problems arising from the way in which encryption keys are maintained in encryption key cache memories in containerized environments. Thus, the illustrative embodiments provide an improved computing tool and improved computing tool functionality/operations specifically designed to address problems arising from the computer arts and which only exist in the computer arts as a result of technology.

Before discussing the illustrative embodiments in further detail, it should be appreciated that, for purposes of the following description, it will be assumed that a Kubernetes implementation is utilized, such as may be provided by the IBM Kubernetes Service (IKS) or Redhat OpenShift on IBM Cloud (ROKS), both available from IBM Corporation of Armonk, New York, or the like. However, it should be appreciated that the illustrative embodiments may be implemented with any containerized environment in which keys are cached for sets of the same containers, as will be apparent to those of ordinary skill in the art in view of the present description.

As mentioned above, containers allow applications to be packaged with their libraries and dependencies, and leverage virtualization mechanisms, to allow the applications to be run on various platforms. In a containerized environment, securing data is often accomplished through encryption, such as envelope encryption. Envelope encryption is the practice of encrypting plaintext data (unencrypted data) with a data encryption key (DEK), and then encrypting the data encryption key under a root key. In best practices, the root key is stored in a key management service, such as IBM Key Protect™, available from International Business Machines (IBM) Corporation of Armonk, New York, such that it can be controlled externally to the encrypted data.

For encryption requests, a DEK is generated and used to encrypt the data. The DEK is then wrapped using the root key via the key management service. The resulting wrapped DEK (WDEK) and the encrypted "secret" data (also referred to simply as a "secret") can then be stored locally. An attacker with access to the stored encrypted data would not be able to decrypt the data without access to the root key.

In order to service decryption requests, the key management service (KMS) needs to use the unwrapped DEK to decode the encrypted secret data. The DEK may be obtained by calling the remote KMS to unwrap the WDEK. However, in order to optimize decryption requests, and minimize the number of calls required to the remote KMS, the KMS encryption provider may be configured to cache a certain number of unwrapped DEKs so that they can be used without another call to the remote KMS. Since DEKs should never be stored "on disk" for security reasons, i.e., in a persistent storage device such as a hard disk, solid state drive (SSD), or the like, this cache resides in memory for each container or compute unit, e.g., a "pod" in Kubernetes, of a set of instances of the same container or compute unit, e.g., a "replica set" in Kubernetes, that handles requests.

It should be appreciated that the KMS is the computing system that handles the wrapping and unwrapping operations for DEKs, whereas the KMS encryption provider is the liaison between services requesting these operations and the KMS. The KMS encryption provider and the KMS may be on separate computing systems and may communicate over one or more data networks. The services that request DEK operations may be on the same set of computing devices as the KMS encryption provider, or may be remote from the KMS encryption provider.

There are issues with the caching of encryption keys for sets, or clusters, of instances of the same container or compute unit, e.g., pods in a replica set, stored in memories associated with these sets (assumed hereafter to be pods of replica sets using the Kubernetes example implementation). First, requests to decrypt the same set of data may go to different pods and therefore, result in cache misses. Second, when the replica set "rolls over", i.e., the replica set needs to be updated by destroying old pods and creating new pods, the cached set of unwrapped DEKs are lost. This scenario may occur, for example, when security patches are applied to the replica set. Because the master pods are cycled, the in-memory cache of the unwrapped DEKs are lost.

In addition, an outage of the KMS or network issues may exacerbate the issue. For example, if the KMS is unavailable or goes down and a pod has several failed decryption requests, it may end up restarting, causing the cached unwrapped DEKs for that pod to be lost. This may cause down time for the data owners and users as they cannot access the decrypted data.

In each of these cases, if the unwrapped DEKs stored in the encryption key cache memory are lost, requests for these unwrapped DEKs may again need to be sent to the KMS to obtain the unwrapped DEKs and rebuild the encryption key cache. This may result in multiple requests being set to the KMS, with the KMS having to service each request (assuming the KMS is available and has not itself gone down or otherwise become unavailable), and provide the unwrapped DEKs for storage in the encryption key cache memory. This causes a large amount of unnecessary overhead and network traffic.

In view of these issues that are specific to encryption key cache management for containerized environments, what is needed is a way to ensure that the encryption key cache for each replica set, responsible for servicing encryption and decryption requests, is as up to date as possible without negatively impacting security. Such a solution should minimize the requirements for sending requests to, and servicing request by, the KMS for unwrapped DEKs.

The illustrative embodiments provide an improved computing tool and improved computing tool functionality/ operations to provide such a solution in which the encryption key caches are synchronized with a KMS in a containerized environment. With the mechanisms of the illustrative embodiments, each pod in a replica set has access to a shared list of wrapped data encryption keys (WDEKs). In addition, each pod maintains their own in-memory cache of unwrapped DEKs corresponding to the WDEKs. For each decryption request, the local encryption cache for the pod is utilized to decrypt the data using the cached unwrapped DEK if possible. For cache misses, i.e., the unwrapped DEK is not present in the local encryption key cache for the pod, a list of WDEKs missing from the local cache is identified based on the shared list of WDEKs. This includes not only the WDEK corresponding to the cache miss, but all other WDEKs in the shared list of WDEKs which are not present in the local encryption key cache. For these WDEKs in the shared list of WDEKs, which are missing from the local encryption key cache, the KMS is called to decrypt these WDEKs and provide the unwrapped DEKs for storage in the local encryption key cache for the pod. The shared list of WDEKs is then updated with the WDEKs that were unwrapped and stored in the local encryption key cache, such as updating a matching entry that is already in the shared list with a current cache time and other information, or adding a new entry to the shared list if a matching entry does not already exist in the shared list.

By sharing the list of WDEKs with the other pods in the replica set, each pod can call out to the KMS to unwrap the WDEK to update their local encryption key cache. This ensures that all pods stay in synchronization in terms of their local encryption key caches. This can improve the performance of decrypting secrets as future requests to decrypt will have a cache hit versus a potential cache miss. In addition, for intermittent issues with the KMS or a data network, it is less likely that a secret will not be able to be decrypted, as it is more likely that at least one of the local encryption key caches of the pods in a replica set will have the unwrapped DEK cached therein. For pod rollover scenarios, a pod can conditionally preload a set of unwrapped DEKs based on the shared list of WDEKs, again thereby reducing cache misses for unwrapped DEKs at the local encryption key caches for the pods and thereby reduce calls to the KMS for the unwrapped DEKs.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As noted above, the illustrative embodiments are specifically directed to providing an improved computing tool and improved computing tool functionality/operations that address issues of locally cached unwrapped data encryption key (DEKs) for containers, e.g., pods, by providing a shared listing mechanism and synchronization logic for synchronizing the local encryption key caches of the containers. Thus, the present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a container encryption key cache synchronization engine as discussed in further detail hereafter. The improved computing tool implements mechanism and functionality, such as the container encryption key cache synchronization engine, which cannot be practically performed by human beings either outside of, or with the assistance of, a technical environment, such as a mental process or the like. The improved computing tool provides a practical application of the methodology at least in that the improved computing tool is able to minimize local encryption key cache misses for containers by ensuring local encryption key cache synchronization with a shared listing of wrapped data encryption keys and thereby minimize requests sent to, and processed by, a key management system.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as container data encryption key (CDEK) cache synchronization engine 200, described in greater detail hereafter with regard to FIG. 2. In addition to the CDEK cache synchronization engine 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and CDEK cache synchronization engine 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in CDEK cache synchronization engine 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in CDEK cache synchronization engine 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement one or more elements of the CDEK cache synchronization engine 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates synchronization of local encryption key caches of containers that reduces cache misses with regard to servicing encryption/decryption requests, and minimizes calls to remote key management systems, resulting in improved performance of the containers while maintaining the security of the data.

Figure 2:
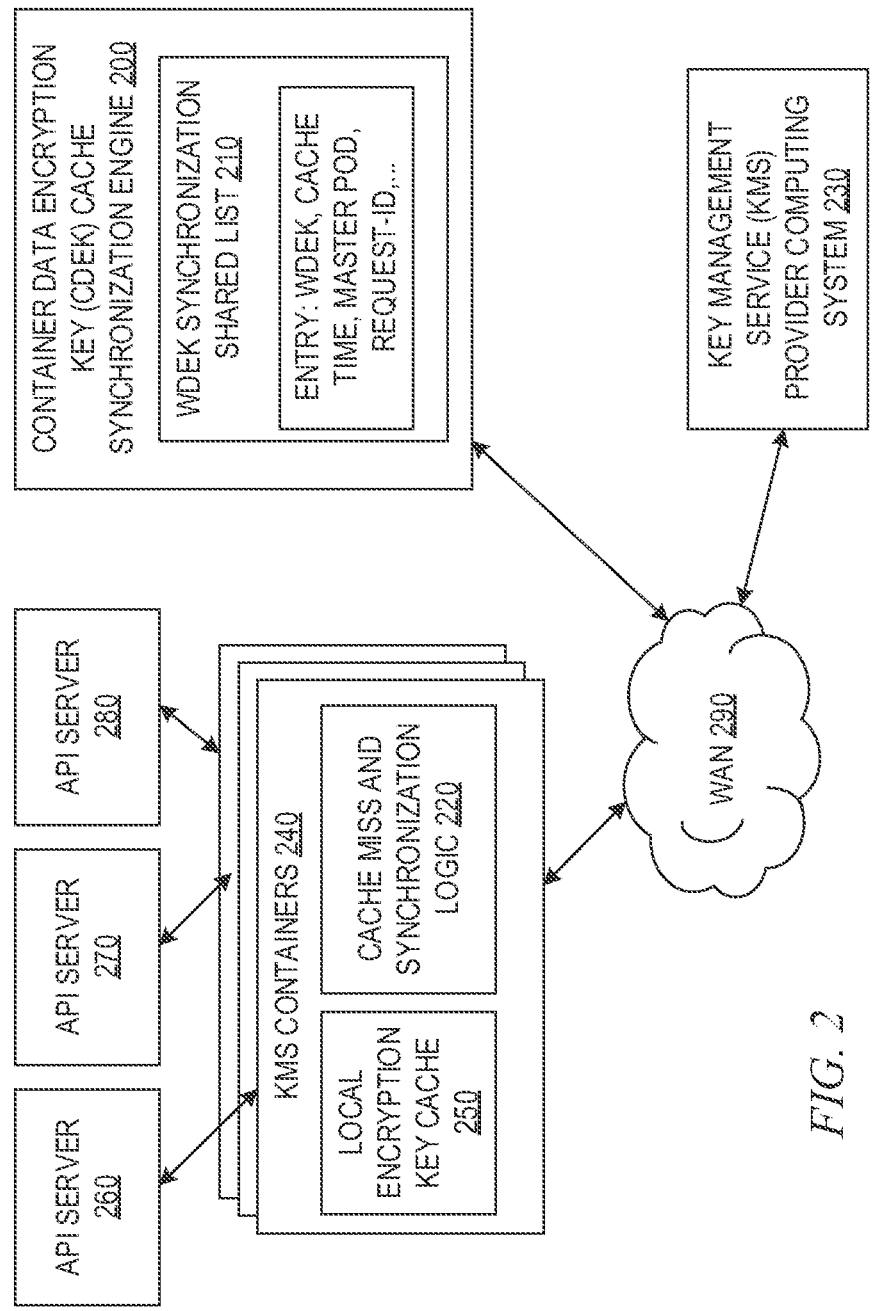
FIG. 2 is an example block diagram illustrating the primary operational components of a container data encryption key cache synchronization engine in accordance with one illustrative embodiment.

FIG. 2 is an example block diagram illustrating the primary operational components of a container data encryption key cache synchronization engine in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings and the resulting output may aid human beings. The invention is specifically directed to the automatically operating computer components directed to improving the way that local data encryption key cache memories are managed by key management systems for containers in a containerized environment, and providing a specific solution that implements a shared list data structure for wrapped data encryption keys and synchronization tools to synchronize the local data encryption key caches of containers with this shared listing, which cannot be practically performed by human beings as a mental process and is not directed to organizing any human activity.

As shown in FIG. 2, the primary operation components comprise a container data encryption key (CDEK) cache synchronization (sync) engine 200 having a wrapped data encryption key (WDEK) synchronization shared list data structure 210 and cache miss and synchronization logic 220. The CDEK cache sync engine 200 operates in conjunction with the KMS containers 240 and key management service (KMS) provider computing system 230. The KMS provider computing system 230 maintains the secret keys in a secure manner for encrypting data encryption keys (DEKs) and thereby generate wrapped data encryption keys. Thus, if a requestor needs to encrypt a DEK, or needs to decrypt a WDEK, the KMS provider computing system 230 must be invoked to perform the encryption/decryption. However, as noted previously, for performance issues, each KMS container 240, or pod, maintains a local encryption key cache 250 for each container/pod set, e.g., a replica set, where this local encryption key cache 250 stores WDEK to DEK mappings so that a DEK corresponding to a WDEK may be identified and used to encrypt/decrypt data for the API servers 260-280 without having to send requests to the KMS provider computing system 230 each time an encryption/decryption operation is required.

The CDEK cache synchronization engine 200 maintains a master list, referred to as the WDEK synchronization shared list 210, of the WDEKs that should have mappings in the local encryption key caches 250 for a corresponding set of containers/pods. The cache miss and synchronization logic 220 operates to handle cache misses when a WDEK to DEK mapping is missing from a local encryption key cache 250, and to ensure that the local encryption key caches 250 of the container/pod set, e.g., replica set, are synchronized with each other and the WDEK synchronization shared list 210. This process is described in greater detail hereafter with regard to FIGS. 3 and 4.

Figure 3:
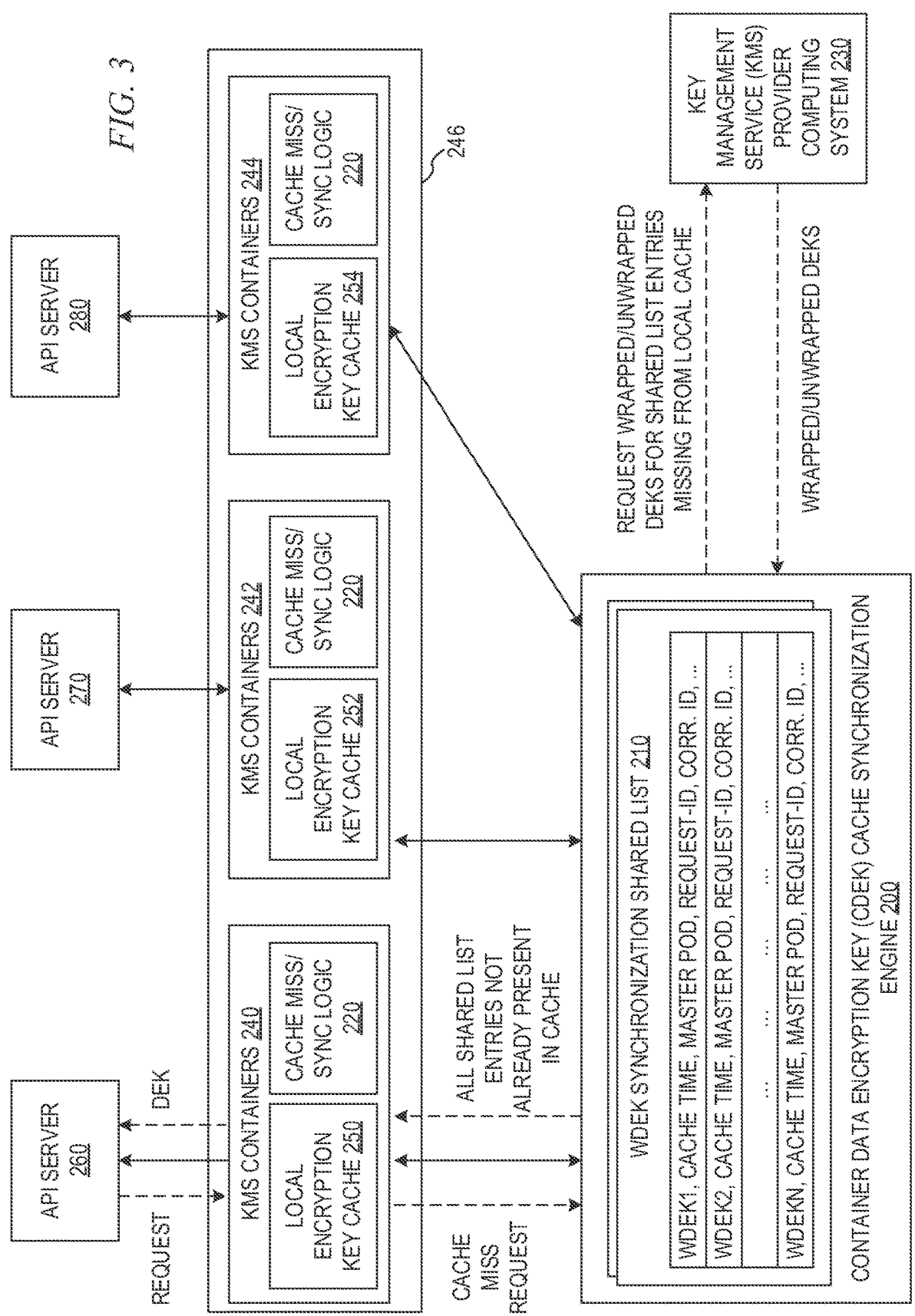
FIG. 3 is a flowchart outlining an example operation of a container data encryption key cache synchronization engine in accordance with one illustrative embodiment.

FIG. 3 is an example diagram illustrating an operation of a container data encryption key cache synchronization engine in the case of a local cache miss when servicing a decryption request, in accordance with one illustrative embodiment. As shown in FIG. 3, API servers 260-280, when accessing secret data, attempt to decrypt the secret data by retrieving the encryption key first from a local cache of a corresponding key management system (KMS) container 240-244. Each KMS container 240-244 in this example is a pod of a replica set 246. Each KMS container 240-244, or pod, has its own corresponding local encryption key cache 250-254 which stores the mapping between the wrapped data encryption keys (WDEKs) and the unwrapped (decrypted) data encryption keys, i.e., WDEK→DEK mapping. Thus, the API servers 260-280 send decryption requests specifying the WDEK to the KMS containers 240-244. If the WDEK is present in the corresponding local encryption key cache 250-254 of the KMS container 240-244 servicing the request, then a cache hit occurs and the corresponding DEK is retrieved and used to decryption the secret data. If the WDEK is not present in the corresponding local encryption key cache 250-254, then a cache miss occurs, and a request must be sent for decrypting the WDEK from the KMS provider computing system 230.

It should be appreciated that a request from an API server 260-280 may be routed to any one of the KMS containers 240-244 and are not limited to sending requests to only one of the KMS containers 240-244. Thus, while the API server 260-280 may initially send a request to KMS container 240, due to various routing conditions, the request may actually be serviced by KMS container 242 in some instances.

In accordance with the illustrative embodiments, the local encryption key caches 250-254 are maintained synchronized as much as possible. However, events may occur that may cause the contents of one local encryption key cache 250-254 to not be synchronized with the other local encryption key caches, e.g., if a replica set 256 rolls over, then the local encryption key caches 250-254 will be emptied, or otherwise cause a requested WDEK to unwrapped DEK to not be present in the local encryption key cache 250-254. As another example, if the KMS provider computing system 230 becomes unavailable due to an outage or a data network 290 issue, then a KMS container 240 may have many failed decryption requests to the KMS provider computing system 230 which may cause the KMS container 240 to restart, which causes the corresponding local encryption key cache 250 to be recreated and the stored unwrapped DEKs in that local encryption key cache 250 being lost and having to be rebuilt.

Moreover, when a new WDEK decryption request is sent from an API server 260, which is a first request for the decryption of the WDEK from any of the API servers 260-280, the WDEK mapping to an unwrapped DEK will not be present in the local encryption key cache 250. Again, as noted above, another issue is that a request from one API server 260-280 may be routed to a different KMS container 240-244 of the replica set 246, which may not have the requested WDEK to unwrapped DEK mapping as this KMS container 240-244 may not have seen the WDEK yet.

In each of these cases, if the wrapped/unwrapped DEKs stored in the encryption key cache memory 250-254 are lost, requests for these wrapped/unwrapped DEKs (an encryption request from an API server 260-280 requests a wrapped DEK (WDEK) and a decryption request from an API server 260-280 requests an unwrapped (decrypted) DEK) may again need to be sent to the KMS provider computing system 230 to obtain the wrapped/unwrapped DEKs and rebuild the local encryption key cache 250-254. This may result in multiple requests being set to the KMS provider computing system 230, with the KMS provider computing system 230 having to service each request, assuming the KMS provider computing system 230 is available and has not itself gone down or otherwise become unavailable, and provide the wrapped/unwrapped DEKs for storage in the local encryption key cache memory 250-254. This causes a large amount of unnecessary overhead and network traffic between the computing devices implementing the KMS containers 240-244 and the KMS provider computing system 230.

In accordance with the illustrative embodiments, a container data encryption key (CDEK) cache synchronization engine 200 is provided that includes a WDEK synchronization shared list 210 and cache miss and synchronization logic 220. The WDEK synchronization shared list 210 is shared amongst each of the container instances of the KMS containers 240-244 of the replica set 246. Thus, there may be a separate WDEK synchronization shared list 210 for each different replica set 246 (only one replica set 246 is shown, but more than one may be present). The WDEK synchronization shared list 210 comprises entries for WDEKs utilized by KMS containers 240-244 within a predefined time period. Thus, there may be a separate entry for each WDEK, e.g., WDEK1 to WDEKn. Each entry may store various identifier, timeout, and audit information for the corresponding WDEK. For example, this information may include the WDEK identifier, the cache time indicating a timestamp of the latest storing of the WDEK in a local encryption key cache 250-254 or expiry time, a master container/pod associated with the WDEK (e.g., the last container/pod to access the WDEK), a request identifier of the last request to utilize the WDEK, a correlation identifier, and the like. For example, in one illustrative embodiment, the entry in the WDEK synchronization shared list 210 may be of the type:
{
 "master": "master-c6ppp6mv10b0aqonir260-6b6d76bf7f-dj52z",
 "cache-time": "2021-12-10T21:00:57.768",
 "wdek": "eyjaXBoZ7J0ZXh0ijoIV1VyK0xmTUIYdU24wZTFzdGNHZGjpMn ...",
 "request-id": "b8f5f890-434e-4534-ba5f-f97056637920",
 "correlation-id": "bff61b91-eac7-4ea0-a327-b1237d05278d"
}

The cache miss and synchronization logic 220 handles cache misses from the KMS containers 240-244 and maintains the WDEK synchronization shared list 210 for the replica sets 246. The cache miss and synchronization logic 220 may, in some illustrative embodiments, be implemented in the KMS containers 240, or in other illustrative embodiments may be implemented in the CDEK cache synchronization engine 200.

When an API server 260, for example, sends a decryption request to the replica set 246 and it is handled by a corresponding KMS container 240, the KMS container 240 first looks to its local encryption key cache 250 for the WDEK corresponding to the request. The local encryption key cache 250 stores entries for WDEKs, mapping the WDEKs to unwrapped DEKs, that the KMS container 240 has utilized, as well as, in accordance with the illustrative embodiments, WDEKs that are to be synchronized amongst the local encryption key caches 250-254 as specified by the cache miss and synchronization logic 220 as discussed hereafter. The entries in the local encryption key cache 250 map the WDEK to a corresponding unwrapped (decrypted) DEK such that the DEK can be used to encrypt/decrypt secret data for the API server 260. These entries may be similar to the entries in the WDEK synchronization shared list 210, but further include the unwrapped DEK. For example, a local encryption key cache 250 entry may be of the type:
{
 "master": "master-c6ppp6mv10b0aqonir260-6b6d76bf7f-dj52z",
 "cache-time": "2021-12-10T21:00:57.768",
 "wdek": "eyjaXBoZ7J0ZXh0ijoIV1VyK0xmTUIYdU24wZTFzdGNHZGjpMn ...",
 "request-id": "b8f5f890-434e-4534-ba5f-f97056637920",
 "correlation-id": "bff61b91-eac7-4ea0-a327-b1237d05278d"
 "dek": "7J0ZXh0IjoiV7J0ZXholjoiVZXh0ljoiV1VyKOxmTUIYdU24wZTFzZh ..."
}
If the WDEK to DEK mapping exists in the local encryption key cache 250, then there is a cache hit and the corresponding DEK is used to respond to the request with the corresponding WDEK/DEK. The usage information is then sent to the cache miss and synchronization (sync) logic 220 to update the information in a corresponding entry of the WDEK sync shared list 210, e.g., updating the cache time, master pod, request id, etc.

If the WDEK to DEK mapping is not present in the local encryption key cache 250, then a cache miss occurs and a request is sent to the key management service (KMS) provider computing system 230, but which is intercepted by the container data encryption key (CDEK) cache synchronization engine 200. The cache miss and sync logic 220 comprises computer implemented logic that handles cache misses from the local encryption key caches 250-254 and updates/maintains the WDEK sync shared list 210 (referred to hereafter as simply the shared list 210) by modifying, adding, and deleting entries in the shared list 210 as part of the process of servicing the requests from the KMS containers (or pods) 240-244. As part of this operation, rather than merely providing the one entry of the WDEK to DEK mapping that is needed in response to a cache miss request, the cache miss and sync logic 220 identifies all of the entries in the shared list 210 that are not present in the local encryption key cache 250 and performs operations to have the KMS provider computing system 230 provide the WDEKs/DEKs for these entries to thereby update the local encryption key cache 250.

Thus, in some illustrative embodiments, the cache miss and sync logic 220 is built into each KMS container 240 as shown. In such embodiments, when the KMS container 240 receives a decryption request it can check its local encryption key cache 250 and in the case of a cache miss, call the KMS provider computing system to request the DEK. The cache miss and sync logic 220 may then receive and cache the DEK into the local encryption key cache 350 and update the WDEK synchronization shared list 210. Periodically the KMS container 240 may check its local encryption key cache 250 contents and compare them against the WDEK synchronization shared list 210 and fetch WDEKs and corresponding DEKs missing from the local encryption key cache 250 which are present in the WDEK synchronization shared list 210. In other illustrative embodiments, the cache miss and sync logic 220 may, in the case of a cache miss on the local encryption key cache 250, check the WDEK synchronization shared list 210 for missing WDEKs and call the KSM provider computing system 230 for the requested WDEK and all other missing WDEKs, thereafter receiving and caching them into the local encryption key cache 250 and updating the WDEK synchronization shared list 210 with updated cache times and/or entries for new WDEKs. In some illustrative embodiments, the cache miss and sync logic 220 may be implemented in the CDEK cache synchronization engine 200 and thus, the KMS containers 240 may comprise logic, or the KMS provider computing system 230 may comprise logic, to route inquiries for WDEKs to the CDEK cache synchronization engine 200 to check these requests against the WDEK synchronization shared list 210 and thereby perform the operations discussed above to synchronize the local encryption key cache 250.

For example, assume that a decryption request from API server 260 requires WDEK1 to be decrypted to access DEK1 so that DEK1 can be used to decrypt secret data required by API server 260. The KMS container 240 looks to the local encryption key cache 250 for the corresponding WDEK1 to DEK1 cache entry. Assuming that the local encryption key cache 250 does not currently have the WDEK1 to DEK1 mapping due to some event or this being the first request for DEK1 from amongst the KMS containers 240-244, a cache miss request is sent to the KMS provider computing system 230 which is intercepted by the CDEK cache sync engine 200. This cache miss request may specify the WDEKs that are present in the local encryption key cache 250 and the WDEK/DEK being requested.

The cache miss and sync logic 220 compares the listing of WDEKs present in the local encryption key cache 250 to the WDEK sync shared list 210 to determine entries in the shared list 210 that are not present in the local encryption key cache 250. This may include the requested WDEK as well as additional WDEKs not already present in the local encryption key cache 250. Thus, for example, if WDEK1 is requested and not present in the local encryption key cache 250, but WDEKs 5, 8, and 10 are also not present in the local encryption key cache 250, but are present in the shared list 210, then each of WDEK1, WDEK5, WDEK8, and WDEK10 will be provided to the local encryption key cache 250. In this way, a single request from the KMS container 240 may cause the local encryption key cache 250 to be synchronized with the shared list 210, and thereby the other local encryption key caches 252-254 of the replica set 246. That is, the shared list 210 stores the master list of all WDEKs that are to be synchronized between the local encryption key caches 250-254 of the replica set and each cache miss request from a KMS container 240-244 causes the corresponding local encryption key cache 250-254 to be updated to be synchronized with the shared list 210.

In updating the local encryption key cache 250, based on the identified WDEKs in the shared list 210 not present in the local encryption key cache 250, as well as the requested WDEK, the cache miss and sync logic 220 sends a request to the KMS provider computing system 230 to provide the WDEK/DEK for updating the local encryption key cache 250. That is, the shared list 210 stores the WDEK, but does not store the unwrapped (decrypted) DEK. Thus, the cache miss and sync logic 220 must obtain the encrypted (for an encryption request) and decrypted (for a decryption request) keys, i.e., the WDEK/DEK, from the KMS provider computing system 230. The KMS provider computing system 230 performs the necessary encryption/decryption and provides the WDEK/DEK back to the cache miss and sync logic 220. The KMS provider computing system 230 does so for all of the WDEKs in the shared listing 210 that are missing from the local encryption key cache 250, as well as the requested WDEK that caused the cache miss. Thus, only one request need be sent from the CDEK cache sync engine 200 to the KMS provider computing system 230 to obtain the WDEKs/DEKs for synchronizing the local encryption key cache 250 with the shared list 210.

The WDEKs/DEKs received from the KMS provider computing system 230 are returned to the KMS container 240 to update the local encryption key cache 250 by adding entries to the local encryption key cache for each WDEK to DEK mapping. In addition, the shared list 210 is updated based on this information as well. That is, existing entries in the shared list 210 for WDEKs are updated to reflect the current cache time, master container/pod, request identifier, etc. corresponding to this cache miss request. A new entry may be added for the requested WDEK if one does not already exist in the shared list 210. In this way, the local encryption key cache 250 is synchronized with the shared list 210.

This process occurs each time there is a cache miss by any of the local encryption key caches 250-252. Thus, for example, if a KMS container 240 fails or has to be restarted, the local encryption key cache 250 will be cleared such that it has no mappings of WDEKs to DEKs. However, the shared list 210 stores the WDEKs that have been utilized by KMS containers 240-244 within a given period of time, e.g., hours, days, months, etc., depending on an implementation preference. Thus, when the KMS container 240 restarts, and attempts to process an encryption/decryption request from an API server 260, a cache miss will occur and a cache miss request will be sent and intercepted by the CDEK cache sync engine 200. Based on the shared list 210, all of the entries in the shared list 210 will be identified as missing from the local encryption key cache 250 and, as a result, a request is sent to the KMS provider computing system 230 to obtain the WDEKs/DEKs for the shared list 210 as well as the requested WDEK that caused the cache miss to occur. This information will then be used to update the local encryption key cache 250, as well as the shared list 210. Thus, with a single cache miss request from the KMS container 240 to the CDEK cache sync engine 200, and a single request from the CDEK cache sync engine 200 to the KMS provider computing system 230, multiple WDEK to DEK mappings may be updated in the local encryption key cache 250.

Moreover, as any cache miss request may cause multiple entries to be updated/created in the local encryption key caches 250-254 based on the shared list 210, synchronization of the local encryption key caches 250-254 is facilitated. This effectively adds entries to the local encryption key caches 250-254 before they are required by API servers 260-280. Thus, this will reduce cache misses and hence, the overhead of sending and processing requests to provide the required WDEKs and DEKs for performing the encryption/decryption operations and accessing secret data.

It should be appreciated that for security purposes, the replica set 246 is stored in memory and not in a persistent storage, i.e., not "on disk", because the local encryption key caches 250-254 store the unwrapped (decrypted) DEKs as part of the WDEK to DEK mappings. However, the WDEK synchronization shared list 210 does not store unwrapped (decrypted) DEKs. Thus, the WDEK synchronization shared list 210 can be stored "on disk" without compromising security. This is beneficial in that, if there is a disaster in which all KMS containers or the computing devices they run on are restarted or offline for some time, the local encryption key caches for these KMS containers may be repopulated by calling the KMS provider computing system 230 with the set of stored WDEKs upon start up. If the WDEK synchronization shared list 210 were stored in memory, it would be lost upon restart and KMS containers would have empty caches and no knowledge of previously used WDEKs and DEKs.

Thus, in some illustrative embodiments, given that each container or pod 240-244 in a replica set 246 has access to the shared list 210 of WDEKs, and given that each container or pod maintains their own local encryption key cache 250-254 that stores WDEK to DEK mappings, the local encryption key caches 250-254 are first utilized to handle encryption/decryption requests. However, for cache misses on these local encryption key caches 250-254, a set of missing WDEKs is identified by comparing the shared list 210 to the contents of the local encryption key cache 250, e.g., a listing of WDEKs in the local encryption key 250 that may be communicated with the cache miss request. The KMS provider computing system 230 is then requested to provided the WDEKs/DEKs corresponding to this set of missing WDEKs and the response from the KMS provider computing system 230 is used to update the local encryption key cache 250 as well as the shared list 210. In this way, the local encryption key cache 250 is maintained consistent with the other local encryption key caches 252-254. The shared list 210 is further updated based on the response from the KMS provider computing system 230 so that each of the KMS containers 240-244 see the same shared list 210 for synchronizing their local encryption key caches 250-254.

Thus, with the improved computing tool and improved computing tool functionality/operations of the illustrative embodiments, cache hits in the local encryption key caches 250-254 are made more likely, and cache misses are minimized. In some illustrative embodiments, the improved computing tool and improved computing tool functionality/operations are able to utilized batch calls to the KMS provider computing system 230 to obtain WDEKs/DEKs for all WDEKs missing from a local encryption key cache 250. In some illustrative embodiments, cache time of the entries in the shared list 210 may be utilized implement an eviction policy by the cache miss and sync logic 220 which may evict entries from local encryption key caches 250-254 and the shared list 210 based on entries becoming stale, i.e., their cache time (or timestamp) is more than a predetermined amount of time prior to the current time.

In addition, because the local encryption key caches 250-254 and shared list 210 are synchronized, the impact of an outage of the KMS provider computing system 230, or a network issue causing the KMS provider computing system 230 to be unavailable, is minimized. That is, there is a smaller likelihood that a cache miss will occur at the local encryption key cache 250 and thus, there will be less of a need to request services from the KMS provider computing system 230 on a regular basis, which means that if the KMS provider computing system 230 becomes unavailable, there is a lower likelihood that this outage will occur at a time when a cache miss occurs.

Moreover, on a container/pod restart, the local encryption key cache 250-254 can be updated with known WDEK information from the shared list 210. Thereby, the CDEK cache sync engine 200 jump-starts the local encryption key cache 250-254 prior to API servers 260-280 needing the corresponding WDEKs/DEKs. This may be especially important in cases where there is a roll over of the replica set 246.

Figure 4:
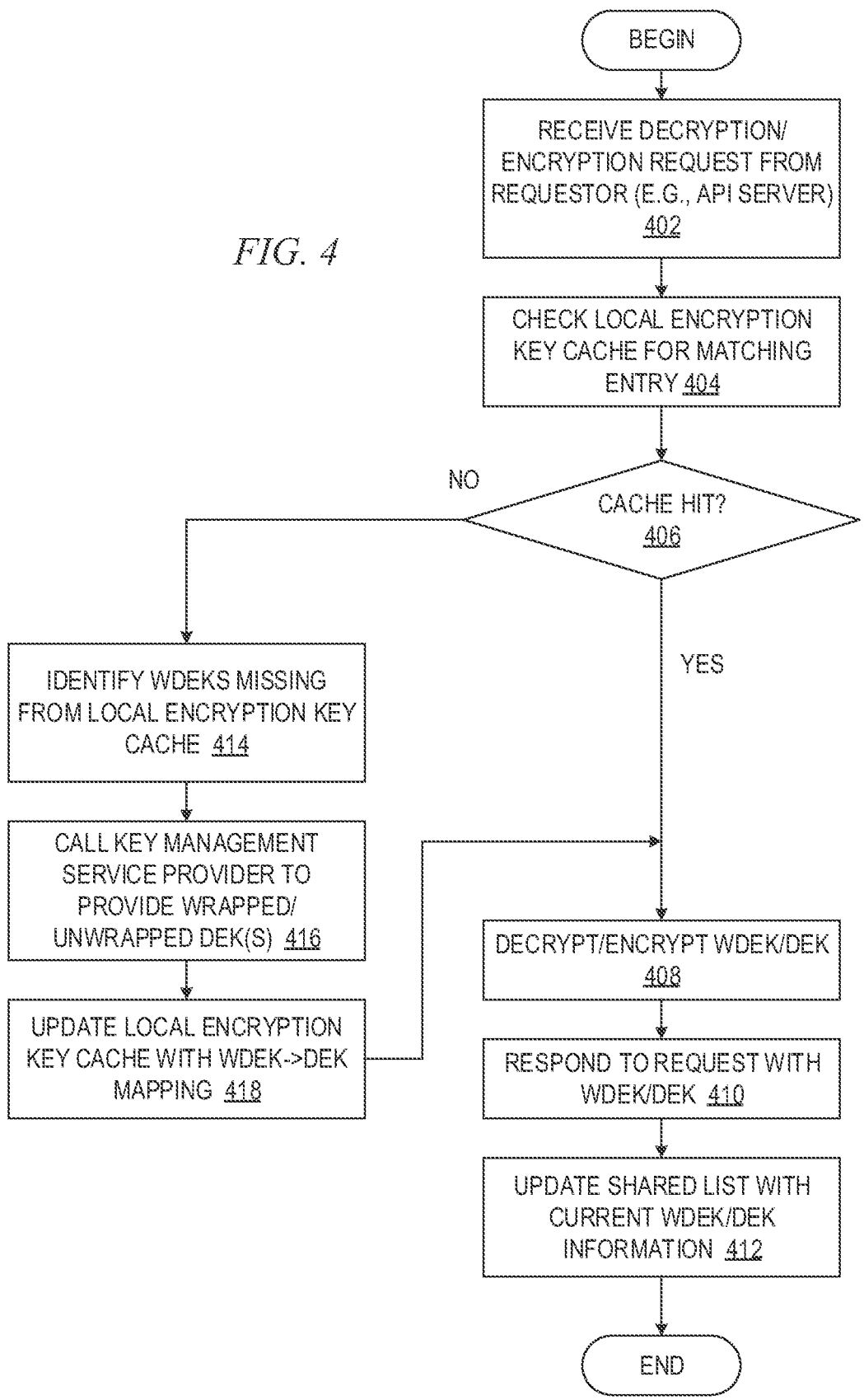
FIG. 4 presents a flowchart outlining an example operation of elements of the present invention with regard to one or more illustrative embodiments.

FIG. 4 presents a flowchart outlining an example operation of elements of the present invention with regard to one or more illustrative embodiments. It should be appreciated that the operation outlined in FIG. 4 is specifically performed automatically by an improved computer tool of the illustrative embodiments and are not intended to be, and cannot practically be, performed by human beings either as mental processes or by organizing human activity. To the contrary, while human beings may, in some cases, initiate the performance of the operation set forth in FIG. 4, and may, in some cases, make use of the results generated as a consequence of the operation set forth in FIG. 4, the operation in FIG. 4 itself is specifically performed by the improved computing tool in an automated manner.

FIG. 4 shows an operation for processing a request, with an example being a decryption request, in accordance with one illustrative embodiment. As shown in FIG. 4, the operation starts by receiving, at a container of a set or container cluster, e.g., replica set, the request, which is assumed for this example to be a decryption request for decrypting a wrapped data encryption key to access the unwrapped (decrypted) data encryption key (step 402). The request may specify the wrapped data encryption key (WDEK) that is to be decrypted so that the container may access the unwrapped data encryption key (DEK) for decrypting data to perform corresponding functions, for example. The local encryption key cache memory is accessed to determine if the required WDEK to unwrapped data encryption key (DEK) is present in the local encryption key cache memory for that container (or pod) (step 404). If the WDEK to DEK mapping is present, then there is a cache hit, otherwise there is a cache miss.

A determination is made as to whether there is a cache hit for the WDEK (step 406). If there is a cache hit, then the WDEK to DEK mapping in the local encryption key cache is utilized to perform the decryption/encryption of the WDEK/DEK (step 408). A response to the request is sent back to the requestor with the requested WDEK/DEK, e.g., the DEK in the case of a decryption request (step 410). The shared list is then updated with the current WDEK/DEK information, e.g., cache time, master container/pod, request id, etc. (step 412).

If the determination in step 406 is that there is a cache miss (step 406: NO), then the WDEKs that are missing from the local encryption key cache are identified (step 414). A call is then made to the key management service provider to provide the wrapped/unwrapped DEK(s) for the missing WDEKs (step 416). The local encryption key cache is then updated with the WDEK to DEK mappings based on a corresponding response from the key management service provider (step 418). The operation then proceeds to steps 408-412 to perform the encryption/decryption operation, response to the original request with the corresponding WDEK/DEK, and update the shared list with the current WDEK/DEK information. The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, of encryption key management for containerized applications, the method comprising:
    receiving, by an application container, a request directed to a first wrapped data encryption key (WDEK);
    determining whether a local encryption key cache associated with the application container stores an entry having a mapping of the first WDEK to a first unwrapped data encryption key (DEK);
    in response to the local encryption key cache not storing the entry, accessing a shared list data structure that stores entries corresponding to WDEKs to be synchronized among a plurality of local encryption key caches of a set of application containers, to determine a set of WDEKs that are missing from the local encryption key cache;
    obtaining, from a key management service, the WDEKs and corresponding DEKs for the set of WDEKs that are missing from the local encryption key; and
    updating the shared list data structure and the local encryption key cache based on the WDEKs and DEKs obtained from the key management service, to thereby synchronize the local encryption key cache with the shared list data structure.

2. The method of claim 1, wherein the set of WDEKS comprises the first WDEK and at least one second WDEK that is missing from the local encryption key cache.

3. The method of claim 2, wherein the at least one second WDEK comprises all other WDEKs in the shared list data structure that do not have an entry in the local encryption key cache.

4. The method of claim 1, wherein the shared list data structure is associated with a replica set of an application container image, and wherein the application container is an instance of the replica set.

5. The method of claim 4, wherein a plurality of shared list data structures are maintained by the data processing system, each shared list data structure being associated with a different replica set of a different application container image.

6. The method of claim 1, wherein updating the local encryption key cache comprises caching an entry in the local encryption key cache that maps the WDEK to the unwrapped DEK, and wherein updating the shared list data structure comprises updating a current cache time for an existing entry in the shared list data structure to represent a current time when the entry mapping the WDEK to the unwrapped DEK is cached in the local encryption key cache, or adding a new entry in the shared list data structure for the WDEK if an existing entry in the shared list data structure does not exist.

7. The method of claim 1, wherein the shared list data structure does not store the unwrapped DEK.

8. The method of claim 1, wherein the request is received from an Application Programming Interface (API) server, and wherein the application container is a key management service container of the key management service.

9. The method of claim 1, further comprising:
    checking, on a periodic basis, entries of the local encryption key cache against the shared list data structure to determine WDEKs present in the shared list data structure that do not have an entry in the local encryption key cache to thereby identify a set of missing WDEKs; and
    retrieving the set of missing WDEKs and their corresponding unwrapped DEKs from the key management service.

10. The method of claim 1, wherein an entry in the shared list data structure stores a corresponding WDEK, a last cached timestamp, a master container instances that last cached the WDEK, and a request identifier of a request that caused the last caching of the WDEK in the local encryption key cache.

11. A computer program product comprising a computer readable storage medium having a computer readable program stored therein, wherein the computer readable program, when executed on a data processing system, causes the data processing system to:
    receive, by an application container, a request directed to a first wrapped data encryption key (WDEK);
    determine whether a local encryption key cache associated with the application container stores an entry having a mapping of the first WDEK to a first unwrapped data encryption key (DEK);
    in response to the local encryption key cache not storing the entry, access a shared list data structure that stores entries corresponding to WDEKs to be synchronized among a plurality of local encryption key caches of a set of application containers, to determine a set of WDEKs that are missing from the local encryption key cache;
    obtain, from a key management service, the WDEKs and corresponding DEKs for the set of WDEKs that are missing from the local encryption key; and update the shared list data structure and the local encryption key cache based on the WDEKs and DEKs obtained from the key management service, to thereby synchronize the local encryption key cache with the shared list data structure.

12. The computer program product of claim 11, wherein the set of WDEKS comprises the first WDEK and at least one second WDEK that is missing from the local encryption key cache.

13. The computer program product of claim 12, wherein the at least one second WDEK comprises all other WDEKs in the shared list data structure that do not have an entry in the local encryption key cache.

14. The computer program product of claim 11, wherein the shared list data structure is associated with a replica set of an application container image, and wherein the application container is an instance of the replica set.

15. The computer program product of claim 14, wherein a plurality of shared list data structures are maintained by the data processing system, each shared list data structure being associated with a different replica set of a different application container image.

16. The computer program product of claim 11, wherein updating the local encryption key cache comprises caching an entry in the local encryption key cache that maps the WDEK to the unwrapped DEK, and wherein updating the shared list data structure comprises updating a current cache time for an existing entry in the shared list data structure to represent a current time when the entry mapping the WDEK to the unwrapped DEK is cached in the local encryption key cache, or adding a new entry in the shared list data structure for the WDEK if an existing entry in the shared list data structure does not exist.

17. The computer program product of claim 11, wherein the shared list data structure does not store the unwrapped DEK.

18. The computer program product of claim 11, wherein the request is received from an Application Programming Interface (API) server, and wherein the application container is a key management service container of the key management service.

19. The computer program product of claim 11, wherein the computer readable program further causes the data processing system to:
check, on a periodic basis, entries of the local encryption key cache against the shared list data structure to determine WDEKs present in the shared list data structure that do not have an entry in the local encryption key cache to thereby identify a set of missing WDEKs; and
retrieve the set of missing WDEKs and their corresponding unwrapped DEKs from the key management service.

20. An apparatus comprising:
at least one processor; and
at least one memory coupled to the at least one processor, wherein the at least one memory comprises instructions which, when executed by the at least one processor, cause the at least one processor to:
receive, by an application container, a request directed to a first wrapped data encryption key (WDEK);
determine whether a local encryption key cache associated with the application container stores an entry having a mapping of the first WDEK to a first unwrapped data encryption key (DEK);
in response to the local encryption key cache not storing the entry, access a shared list data structure that stores entries corresponding to WDEKs to be synchronized among a plurality of local encryption key caches of a set of application containers, to determine a set of WDEKs that are missing from the local encryption key cache;
obtain, from a key management service, the WDEKs and corresponding DEKs for the set of WDEKs that are missing from the local encryption key; and
update the shared list data structure and the local encryption key cache based on the WDEKs and DEKs obtained from the key management service, to thereby synchronize the local encryption key cache with the shared list data structure.

* * * * *